Patented Feb. 17, 1942

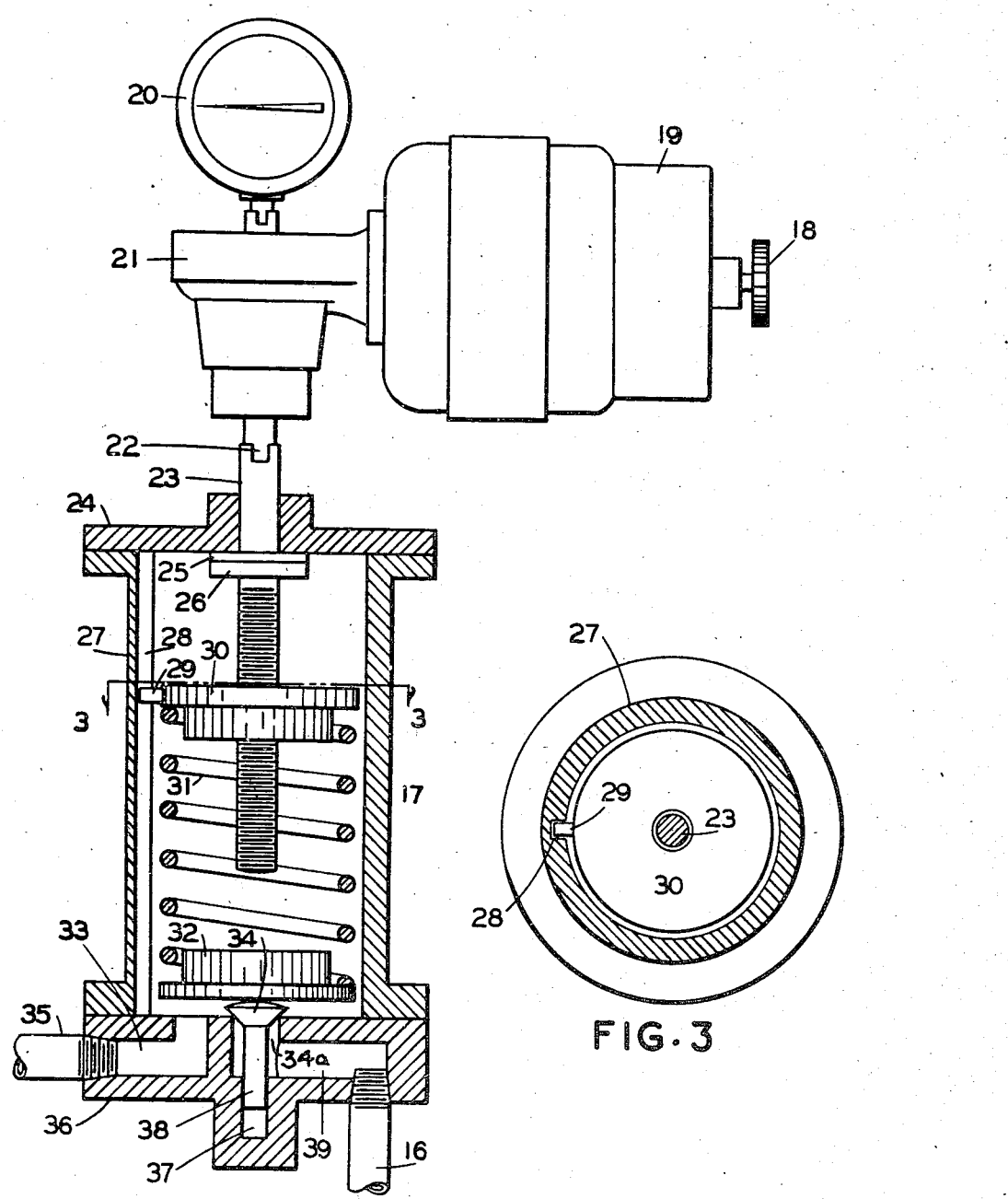

2,273,152

UNITED STATES PATENT OFFICE 2,273,152

HYDRAULIC PRESSURE CONTROL FOR TESTING MACHINES

Alfred Sonntag, Moline, Ill., assignor to American Machine and Metals, Inc., New York, N. Y., a corporation of Delaware Application March 21, 1938, Serial No. 197,227

10 Claims. (Cl. 265—14)

This invention relates to a mechanism for controlling a hydraulic system in such a manner as to cause a constant rate of change of pressure in the system as a function of time regardless of other changes in the system.

This system is particularly applicable to the control of a hydraulic testing machine, intended to apply force to a specimen by increments for the purpose of determining the behavior of the specimen for comparative purposes. I have, therefore, chosen to illustrate it in connection with a hydraulic compression testing machine in which the specimen is intended to be compressed between a hydraulic ram and an anvil. The device has many specific advantages when applied to a testing machine, although it will be evident that it has applications of a wider scope and may in this respect be applied to many other uses.

In the testing of specimens to discover their physical properties the amount of yield of the specimen depends not only on the pressure applied but also upon the length of time to which it is subjected to each increment of pressure. To get comparable results, therefore, it is important that the function between the pressure and the time shall follow a predetermined curve and preferably that equal increments of pressure shall be applied in equal times.

In the testing of materials, however, there is a sudden increase in the yield per unit of pressure at a certain value, whereas the ordinary hydraulic system is adapted to take care of a constant rate of yield rather than a constant pressure resistance; that is the ordinary system feeding the liquid to the ram at a constant rate is in itself unable to produce a constant rate of pressure increase.

It is a further object of the present invention to provide a system which will insure a constant rate of pressure increase regardless of the conditions within the hydraulic system, as for example regardless of the rate of movement of the ram corresponding to the rate of yield of the specimen by providing an increased supply of liquid to take care of an increased demand for liquid to maintain the constant rate of pressure increase.

It is a further object to provide a system of the character described which will be simple and reliable in operation and which can be counted upon to give uniform operation at all times so that when used with a testing machine, subsequent tests of similar specimens will produce comparable results.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention, reference should be had to the following detailed description, taken in connection with the accompanying drawings, in which:

Figure 2 shows an elevation partly in section of the relief valve.

Figure 3 shows a cross section of the relief valve along lines 3—3 of Figure 2.

Figure 1:
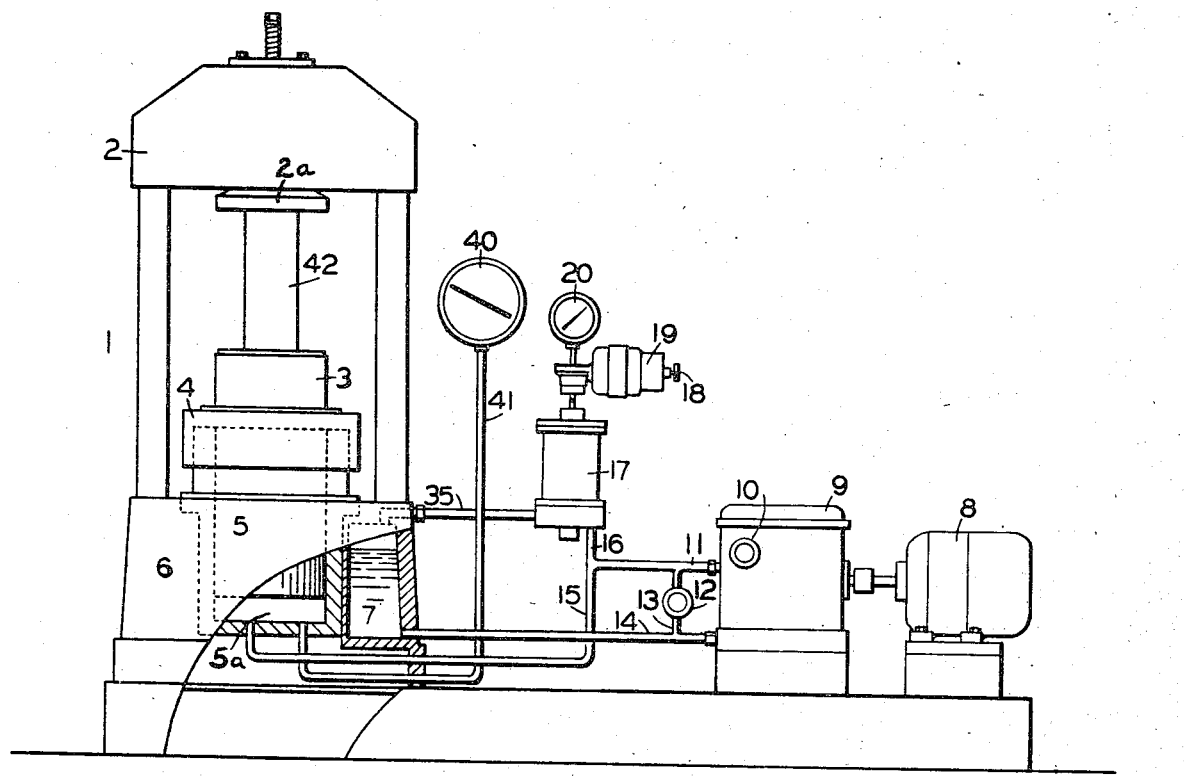
Figure 1 shows an elevation partly in section of my hydraulic pressure control applied to a compression testing machine.

The testing machine 1 comprises generally a head 2 carrying an anvil 2a and a ram 3 extending upwardly from a bed 4 and having a lower portion or piston 5 moving within a cylinder 5a within the frame work 6 of the machine. Within the frame 6 is also provided a sump 7 and mechanism is provided in accordance with this invention for moving the liquid from the sump 7 into the cylinder 5a under pressure. The testing machine hereinbefore described is representative of a general type of hydraulic testing machine.

The hydraulic system comprises primarily a motor 8 driving a liquid pump 9 having a control valve 10 controlling the discharge of the liquid under pressure into a high pressure conduit 11 connected to the cylinder 5a by a conduit 15 and having its intake 14 connected to the sump 7.

A release valve 12 in a line 13 connecting the conduits 11 and 14 may be used either to release the pressure, taking the stress off the specimen, or may be partially opened to allow a continuous discharge from conduit 11 to conduit 14 to lower the pressure. To protect the pump and the control, mechanism is provided for controllingly connecting the high pressure conduit 11 with the sump 7 so as automatically to control the pressure within the cylinder 5a.

As shown, a conduit 16 connects the high pressure conduit 11 with an automatic valve 17, which in turn is connected to the sump 7 by a conduit 35.

The automatic valve 17 has a variable pressure control device and it is operated to relieve the pressure within the cylinder whenever it increases faster than setting of the control device and this control device is varied in its setting, regularly by a motor 19 having a speed control 18 and a tachometer 20.

The motor 19 is arranged to drive a mechanism for varying the setting of the pressure control device in accordance with the plan for which the machine is arranged. As shown, it is arranged constantly to increase the pressure setting at a fixed rate. To accomplish this the motor 19 is provided with a reduction gearing 21 and a coupling 22 to drive a vertical shaft 23 mounted in the head 24 of the automatic valve 17 and a thrust bearing 25—26 permits rotation of the shaft 23 in its bearings in the head but prevents endwise movement thereof. The body of the automatic valve comprises a cylinder 27 attached to the head 24 and carrying a slot 28 to engage a pin 29 on a nut 30 which is screwed as shown in Figure 3, upon the shaft 23, a spring 31 is confined between the nut 30 and a block 32 in the lower end of the cylinder and this latter block bears upon a valve 34 which will be described, so that the spring 31 exercises its full pressure upon the valve 34, and the pressure is determined by the position of the nut 30.

The bottom head of the automatic valve cylinder includes two bores or channels, one bore 33 communicating with the interior of the cylinder 27 and being connected by the conduit 35 with the sump 7. The other bore 39 communicating with the high pressure conduit 16 and with the interior of the cylinder 27 through a port 34a controlled by the valve 34. This valve is guided for vertical movement by a stem 38 moving in a guide 37.

By the above construction it will be clear that the pressure within the bore 39, which in fact is the pressure within the cylinder 5a, tends to force the valve 34 upwardly away from its seat, against the action spring 31 and when it so moves it permits liquid to flow from the pressure bore 39 to the bore 33 which is in communication with the sump 7. As soon, however, as the pressure within the bore 39 falls below that for which the spring 31 is set, the spring overcomes the upward thrust of the valve and closes it so that the pressure within the cylinder 5a will at all times be that for which the spring 31 is set.

A downward movement of the nut 30 makes an increase in pressure upon the spring 31 exactly proportional to the movement of the nut and hence causes a proportional increase of pressure within the cylinder 5a, regardless, within the capacity of the machine, of the quantity of liquid which it takes to create that pressure.

The motor 19 as shown being geared to rotate the shaft 23 at a uniform rate moves the nut 30 downwardly at a uniform rate and consequently increases the pressure within the system at a uniform rate. A pressure gauge 40 may be used to determine the exact pressure upon the specimen 42 at any given moment and if standard specimens be applied, the gauge 40 may be made to read direct in pounds per square inch of the specimen if desired.

The control valve 10 serves to control the discharge of the pump to limit it to that quantity which is most efficient in the operation of the device.

In testing any particular specimen with this machine it will be clear that the nut 30 is first raised to its uppermost position at a point where the valve 34 opens freely. Thereupon the motor 19 is regulated by device 18 to a speed which will move the nut downwardly at the predetermined rate such as to give the predetermined rate of increase of pressure within the system and preferably the tachometer 20 will be calibrated to read directly in the number of increments of pressure per second which will result from such movement.

When the specimen 42 has been put in place between the anvil and the ram the motor 19 is started in operation or, if in operation, is connected in to drive the shaft 23 and simultaneously the control valve 10 is manipulated to admit liquid under pressure to the system in greater volume than the maximum which will be required by the direct displacement of the piston 5. At any time, however, that the pressure within the cylinder 5a tends to rise above that for which the automatic valve is set, some liquid will flow through the port 34a into the sump until the desired pressure has been restored, and thus the pressure within the cylinder rises as determined by the setting of the control valve 17.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a testing machine, in combination, means for holding a specimen to be tested, means for exerting stress upon the specimen including a cylinder, a plunger moving in the cylinder, a sump for storing fluid, a pump capable of drawing more fluid and at a higher pressure from the sump than is needed to move the plunger enough to offset the distortion of the specimen under a pre-set stress, a conduit from the pump to the cylinder, a by-pass from the conduit back to the sump designed to by-pass a part of the fluid delivered, automatic control means in the by-pass for varying the amount by-passed to secure a pre-set pressure of fluid in the conduit and under the plunger.

2. In a testing machine, in combination, means for holding a specimen to be tested, means for exerting stress upon the specimen including a cylinder, a plunger moving in a cylinder, a sump for storing fluid, a pump capable of drawing more fluid and at a higher pressure from the sump than is needed to move the plunger enough to offset the distortion of the specimen under a pre-set stress, a conduit from the pump to the cylinder, a by-pass from the conduit back to the sump designed to by-pass a part of the fluid delivered by the pump to lower the pressure in the conduit to approach the pre-set pressure, a second by-pass from the conduit back to the sump, automatic control means in the second by-pass for varying the additional amount of fluid by-passed to secure the preset pressure of fluid in the conduit and under the plunger.

3. In a testing machine, in combination, means for holding a specimen to be tested, means for exerting stress upon the specimen including a cylinder, a plunger moving in the cylinder, a sump for storing fluid, a pump capable of drawing more fluid and at a higher pressure from the sump than is needed to move the plunger enough to offset the distortion of the specimen under a preset stress, a conduit from the pump to the cylinder, a bypass from the sump designed to bypass a part of the fluid delivered, automatic control means in the bypass for varying the amount bypassed to secure a preset pressure of fluid in the conduit and under the plunger and means for automatically varying the setting of the automatic control means in the bypass to vary the preset stress on the specimen in a predetermined manner.

4. In a testing machine, in combination, means for holding a specimen to be tested, means for exerting stress upon the specimen including a cylinder, a plunger moving in the cylinder, a sump for storing fluid, a pump capable of drawing more fluid and at a higher pressure from the sump than is needed to move the plunger enough to offset the distortion of the specimen under a preset stress, a conduit from the pump to the cylinder, a bypass from the conduit back to the sump designed to by pass a part of the fluid delivered, automatic control means in the bypass for varying the amount bypassed to secure a preset pressure of fluid in the conduit and under the plunger and means for automatically varying the setting of the automatic control means in the bypass to vary the preset stress on the specimen at a uniform rate per unit of time.

5. In a testing machine, in combination, means for holding a specimen to be tested, means for exerting stress upon the specimen including a cylinder, a plunger moving in the cylinder, a sump for storing fluid, a pump capable of drawing more fluid and at a higher pressure from the sump than is needed to move the plunger enough to offset the distortion of the specimen under a preset stress, a conduit from the pump to the cylinder, a bypass from the conduit back to the sump designed to bypass a part of the fluid delivered by the pump to lower the pressure in the conduit to approach the preset pressure, a second bypass from the conduit back to the sump, automatic control means in the second bypass for varying the additional amount of fluid bypassed to secure the present pressure of fluid in the conduit and under the plunger wherein the automatic control means in the second bypass includes a valve which the pressure in the system tends to force open and yielding means tending to hold the valve shut, said yielding means exerting a substantially constant force to hold the valve shut throughout the normal range of movement of the valve, and automatic means for changing the force exerted upon the valve by said yielding means.

6. In a testing machine, in combination, means for holding a specimen to be tested, means for exerting stress upon the specimen including a cylinder, a plunger moving in the cylinder, a sump for storing fluid, a pump capable of drawing more fluid and at a higher pressure from the sump than is needed to move the plunger enough to offset the distortion of the specimen under a preset stress, a conduit from the pump to the cylinder, a bypass from the conduit back to the sump designed to bypass a part of the fluid delivered by the pump to lower the pressure in the conduit to approach the preset pressure, a second bypass from the conduit back to the sump, automatic control means in the second bypass for varying the additional amount of fluid bypassed to secure the preset pressure of the fluid in the conduit and under the plunger wherein the automatic control means in the second bypass includes a valve which the pressure in the system tends to force open and yielding means tending to hold the valve shut, said yielding means exerting a substantially constant force to hold the valve shut throughout the normal range of movement of the valve, and means stressing the spring automatically in accord with a predetermined schedule.

7. In a testing machine, in combination, means for holding a specimen to be tested, means for exerting stress upon the specimen including a cylinder, a plunger moving in the cylinder, a sump for storing fluid, a pump capable of drawing more fluid at a higher pressure from the sump than is needed to move the plunger enough to offset the distortion of the specimen under a preset stress, a conduit from the pump to the cylinder, a bypass from the conduit back to the sump designed to bypass a part of the fluid delivered by the pump to lower the pressure in the conduit to approach the preset pressure, a second bypass from the conduit back to the sump, automatic control means in the second bypass for varying the additional amount of fluid bypassed to secure the preset pressure of fluid in the conduit and under the plunger wherein the automatic control means in the second bypass includes a valve which the pressure in the system tends to force open and yielding means tending to hold the valve shut, said yielding means exerting a substantially constant force to hold the valve shut throughout the normal range of movement of the valve, and means stressing the spring automatically at a uniform rate by moving the abutment of the spring opposed to the valve toward or away from the valve at a uniform rate.

8. In a testing machine, in combination, means for holding a specimen to be tested, means for exerting stress upon the specimen including a cylinder, a plunger moving in a cylinder, a sump for storing fluid, a pump capable of drawing more fluid and at a higher pressure from the sump than is needed to move the plunger enough to offset the distortion of the specimen under a preset stress, a conduit from the pump to the cylinder, a bypass from the conduit back to the sump designed to bypass a part of the fluid delivered by the pump to lower the pressure in the conduit to approach the preset pressure, a second bypass from the conduit back to the sump, automatic control means in the second bypass for varying the additional amount of fluid bypassed to secure the preset pressure of fluid in the conduit and under the plunger wherein the automatic control means in the second bypass includes a disc valve which the pressure in the system tends to force from its seat, a spring tending to hold the disc valve against its seat, said spring exerting a substantially constant force upon the valve throughout the normal range of movement of the valve disc, the other end of the spring supported by a non-rotating nut carried axially along a stationary screw axial to the spring when the screw is revolved, and means for automatically revolving the screw.

9. In a testing machine, in combination, means for holding a specimen to be tested, means for exerting stress upon the specimen including a cylinder, a plunger moving in the cylinder, a sump for storing fluid, a pump capable of drawing more fluid and at a higher pressure from the sump than is needed to move the plunger eonugh to offset the distortion of the specimen under a preset stress, a conduit from the pump to the cylinder, a bypass from the conduit back to the sump designed to bypass a part of the fluid delivered by the pump to lower the pressure in the conduit to approach the preset pressure, a second bypass from the conduit back to the sump, automatic control means in the second bypass for varying the additional amount of fluid bypassed to secure the preset pressure of fluid in the conduit and under the plunger wherein the automatic control means in the second bypass includes a disc valve which the pressure in the system tends to force from its seat, a spring tending to hold the disc valve against its seat, said spring exerting a substantially constant force upon the valve throughout the normal range of movement of the valve disc, the other end of the spring supported by a non-rotating nut moving along a stationary screw changing the length of the spring when the screw is revolved, and means for revolving the screw automatically, said means including the constant-speed power source and a variable speed gear reducer.

10. A testing machine in accord with claim 1 wherein the automatic control means in the bypass include a valve which the pressure in the system tends to force open and yielding means tending to hold the valve shut, said yielding means exerting a substantially constant force upon the valve throughout the normal range of movement of the valve.

ALFRED SONNTAG.